(12) United States Patent
Zhao et al.

(10) Patent No.: US 10,659,533 B1
(45) Date of Patent: May 19, 2020

(54) LAYER-AWARE DATA MOVEMENT CONTROL FOR CONTAINERS

(71) Applicant: EMC IP Holding Company LLC, Hopkinton, MA (US)

(72) Inventors: Junping Zhao, Beijing (CN); Kevin Xu, Warren, NJ (US); Mohamed Sohail, New Cairo (EG); Wei Cui, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 15/497,493

(22) Filed: Apr. 26, 2017

(51) Int. Cl.
*H04L 29/08* (2006.01)
*G06F 12/10* (2016.01)
*G06F 3/06* (2006.01)
*G06F 9/455* (2018.01)

(52) U.S. Cl.
CPC .......... *H04L 67/1097* (2013.01); *G06F 12/10* (2013.01); *H04L 67/2847* (2013.01); *G06F 3/0647* (2013.01); *G06F 3/0665* (2013.01); *G06F 9/45558* (2013.01)

(58) Field of Classification Search
CPC ............... G06F 9/45558; G06F 3/0647; G06F 9/45533; H04L 29/08072
See application file for complete search history.

(56) References Cited

U.S. PATENT DOCUMENTS

| | | | | |
|---|---|---|---|---|
| 8,977,735 | B2 * | 3/2015 | Salinas | G06F 9/45558 709/223 |
| 9,772,792 | B1 * | 9/2017 | Wallner | G06F 3/0608 |
| 2012/0210095 | A1 * | 8/2012 | Nellans | G06F 12/10 711/206 |
| 2017/0308330 | A1 * | 10/2017 | Suresh | G06F 3/0665 |
| 2018/0088978 | A1 * | 3/2018 | Li | G06F 13/28 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

(Continued)

*Primary Examiner* — Barbara B Anyan
(74) *Attorney, Agent, or Firm* — Ryan, Mason & Lewis, LLP (57) ABSTRACT

An apparatus in one embodiment comprises a plurality of container host devices of at least one processing platform. The container host devices implement a plurality of containers for executing applications on behalf of one or more tenants of cloud infrastructure. The containers have associated layer structures each characterizing container images of respective different ones of the containers. Movement of container data between different storage devices by at least one of the container host devices for at least one of the containers is controlled based at least in part on one or more characteristics of a corresponding one of the layer structures. For example, controlling movement of container data between the different storage devices may comprise assigning at least one of different prefetching priority weights and different cache-swapping priority weights to different layers of the given layer structure.

20 Claims, 6 Drawing Sheets

(56) References Cited

U.S. PATENT DOCUMENTS

2018/0293374 A1* 10/2018 Chen ...................... G06F 21/53

OTHER PUBLICATIONS

U.S. Appl. No. 15/189,447 filed in the name of Junping Zhao et al. on Jun. 22, 2016 and entitled "Accelerated Data Access Operations."

U.S. Appl. No. 15/195,451 filed in the name of Accela Zhao et al. on Jun. 28, 2016 and entitled "Container Image Layer Compaction."

U.S. Appl. No. 15/490,241 filed in the name of Junping Zhao et al. on Apr. 18, 2017 and entitled "Grouping-Based Container Management and Data Services."

* cited by examiner

LAYER-AWARE DATA MOVEMENT CONTROL FOR CONTAINERS

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to manage access to container images in cloud infrastructure comprising dense container deployments.

SUMMARY

Illustrative embodiments provide layer-aware data movement control for containers in cloud infrastructure. Such arrangements can provide highly efficient container management in dense container deployments.

In one embodiment, an apparatus comprises a plurality of container host devices of at least one processing platform. The container host devices implement a plurality of containers for executing applications on behalf of one or more tenants of cloud infrastructure. The containers have associated layer structures each characterizing container images of respective different ones of the containers. Movement of container data between different storage devices by at least one of the container host devices for at least one of the containers is controlled based at least in part on one or more characteristics of a corresponding one of the layer structures.

For example, controlling movement of container data between the different storage devices may comprise assigning at least one of different prefetching priority weights and different cache-swapping priority weights to different layers of the given layer structure.

Additionally or alternatively, controlling movement of container data between the different storage devices may comprise maintaining separate least recently used or least frequency used lists for each of two or more distinct layers of the given layer structure.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated host devices, storage devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments. The term "cloud infrastructure" as used herein is intended to be broadly construed to encompass these and other information processing system environments that include at least a portion of at least one cloud.

Figure 1:
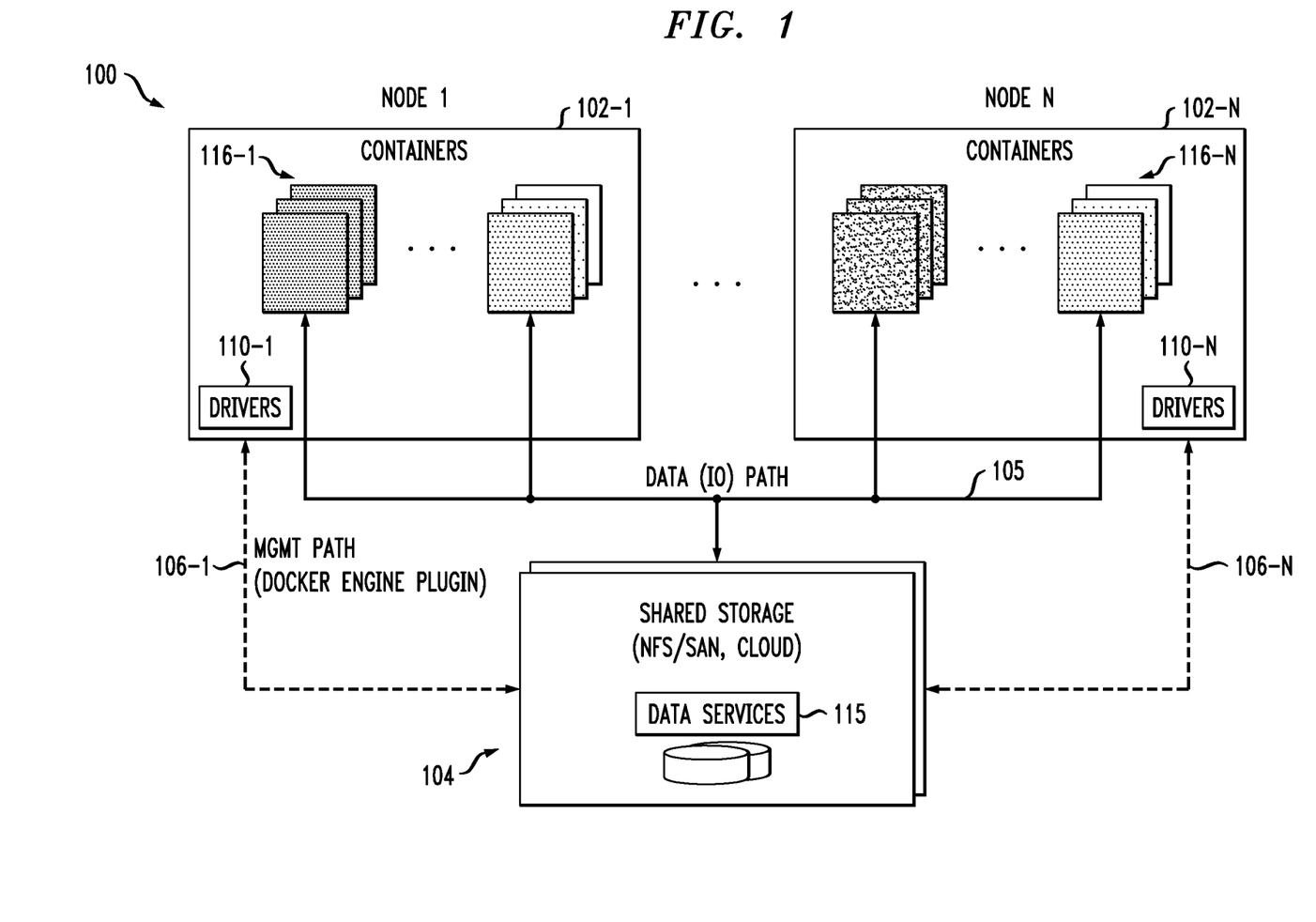
FIG. 1 is a block diagram of an information processing system configured for layer-aware data movement control for containers in an illustrative embodiment.

FIG. 1 shows an information processing system 100 configured to implement functionality for layer-aware data movement control for containers in cloud infrastructure. The system 100 comprises at least one processing platform implementing a plurality of container host devices configured as a plurality of nodes 102-1 through 102-N, also denoted as Node 1, . . . Node N, respectively. The container host devices providing the nodes 102 are examples of what are more generally referred to herein as "processing devices" of the one or more processing platforms of the system 100. Each such processing device of a given processing platform comprises at least one processor coupled to a memory. A given one of the nodes 102 can illustratively comprise a single container host device. Alternatively, one or more of the nodes 102 can each comprise a plurality of container host devices.

At least a subset of the container host devices may comprise respective virtual machines controlled by a hypervisor of the processing platform, although numerous other types of container host devices may be used.

The nodes 102 can illustratively comprise respective compute nodes of the cloud infrastructure. For example, the nodes 102 can comprise respective compute nodes of an Amazon Web Services (AWS) system. Other examples of cloud-based systems that can be used to implement nodes 102 and possibly other portions of system 100 include Google Cloud Platform (GCP) and Microsoft Azure.

The nodes 102 may be implemented on a per-tenant basis and extend in a distributed manner across container host devices of multiple public, private or hybrid clouds.

A given such cloud can comprise a Platform-as-a-Service (PaaS) layer overlying an Infrastructure-as-a-Service (IaaS) layer. The IaaS layer comprises a plurality of virtual machines supporting application containers of the PaaS layer. For example, container host devices in such an embodiment are assumed to correspond to respective ones of the virtual machines of the IaaS layer.

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

The nodes 102 in the present embodiment share a common storage system 104, also referred to as "shared storage." The nodes 102 have data access to the storage system 104 via an input-output (TO) data path 105. The nodes 102 also communicate with the storage system 104 via respective management ("Mgmt") paths 106, illustrated by dashed arrows in the figure. More particularly, node 102-1 communicates with storage system 104 over management path 106-1 via a set of one or more drivers 110-1. Similarly, node 102-N communicates with storage system 104 over management path 106-N via a set of one or more drivers 110-N. The drivers 110 associated with the respective management paths 106 illustratively correspond to respective extended engine plugins, such as Docker engine plugins.

The storage system 104 in the present embodiment provides data services 115 for containers 116 of the nodes 102.

The nodes 102-1 through 102-N more particularly comprise respective sets of containers 116-1 through 116-N. A given such set of containers or a portion of such a set of containers may be associated with a particular tenant of the system 100. Different storage volumes or other portions of the storage system 104 are illustratively allocated to respective ones of the containers 116.

Examples of data services 115 that may be provided for containers 116 include data caching services, storage tiering services, data deduplication services, networking services and data security services. Numerous other types of data services may additionally or alternatively be implemented for particular containers. Some of the data services 115 may run at least in part in the corresponding container host devices. For example, caching services may involve one or more caches of respective container host devices. As another example, tiering hints for a storage tiering service can be generated in the container host devices. As a further example, one or more deduplication domains for a deduplication service may be in a container host device rather than in the storage system 104.

The containers 116 may be automatically arranged in multiple groups for efficient container management and/or for provision of similar data services or other related functionality to the particular containers of each group, as described in U.S. patent application Ser. No. 15/490,241, filed Apr. 18, 2017 and entitled "Grouping-Based Container Management and Data Services," which is incorporated by reference herein. For example, the containers on one or more of the nodes 102 may be separated into at least first and second distinct container groups based at least in part on results of comparisons of layer structures each characterizing container images of respective different ones of the containers. It is to be appreciated, however, that utilization of such container grouping techniques is not required for illustrative embodiments of the present disclosure.

As indicated above, the containers 116 are illustratively configured for executing applications on behalf of one or more tenants of cloud infrastructure of the system 100. Such cloud infrastructure of system 100 illustratively comprises at least portions of the nodes 102 and the storage system 104. For example, different ones of the nodes 102 may be associated with different tenants. Additionally or alternatively, multiple ones of the nodes 102 may be associated with a single one of the tenants.

In the system 100 of FIG. 1, the containers 116 are assumed to have associated layer structures each characterizing container images of respective different ones of the containers. Such structures are also referred to herein as container image layer structures.

A layer structure in some embodiments comprises one or more read-only (RO) layers each associated with one or more container images, and one or more read-write (RW) layers each associated with at least one running instance of at least one of the containers. A more detailed example of such a layer structure will be described below in conjunction with FIG. 3. Other types of layer structures can be used in other embodiments.

The container host devices comprising nodes 102 and the corresponding shared storage comprising storage system 104 are further assumed to comprise multiple distinct storage devices, such as different electronic storage devices and disk-based storage devices, or other types of storage devices in any combination. The term "storage device" as used herein is intended to be broadly construed so as to encompass, for example, at least a portion of a cache or persistent storage of a container host device, at least a portion of an electronic memory or disk-based memory of the storage system 104, or other types and arrangements of memory that may be implemented in system 100.

Layer-aware data movement control functionality is provided in the system 100 in order to provide more efficient management of the containers 116. In accordance with that functionality, movement of container data between different storage devices by at least one of the container host devices for at least one of the containers 116 is controlled based at least in part on one or more characteristics of a corresponding one of the layer structures.

For example, the different storage devices may comprise at least portions of respective persistent storage of a given one of the container host devices and the storage system 104 shared by the container host devices.

The term "container data" as used herein is intended to be broadly construed so as to encompass, for example, at least portions of one or more container images, possibly including static data files, as well as other types of container information associated with respective running containers such as libraries, executables, configuration files, etc. These and other types of information are intended to be encompassed by the term "container data" as used herein and may be subject to layer-aware data movement control in illustrative embodiments. Accordingly, data subject to movement control based on layer structures can include libraries, executables, configuration files and other container information required for a running container, as well as data to be processed by the running container.

In some embodiments, a given one of the container host devices is configured to control movement of container data between the multiple storage devices by prefetching at least a portion of the container data from the storage system 104 into persistent storage of the container host device based at least in part on one or more characteristics of a corresponding one of the layer structures.

Additionally or alternatively, a given one of the container host devices is configured to control movement of container data between the multiple storage devices by swapping at least a portion of the container data stored in a cache of the container host device with one or more other portions of container data stored in another storage device based at least in part on one or more characteristics of a corresponding one of the layer structures.

Figure 2:
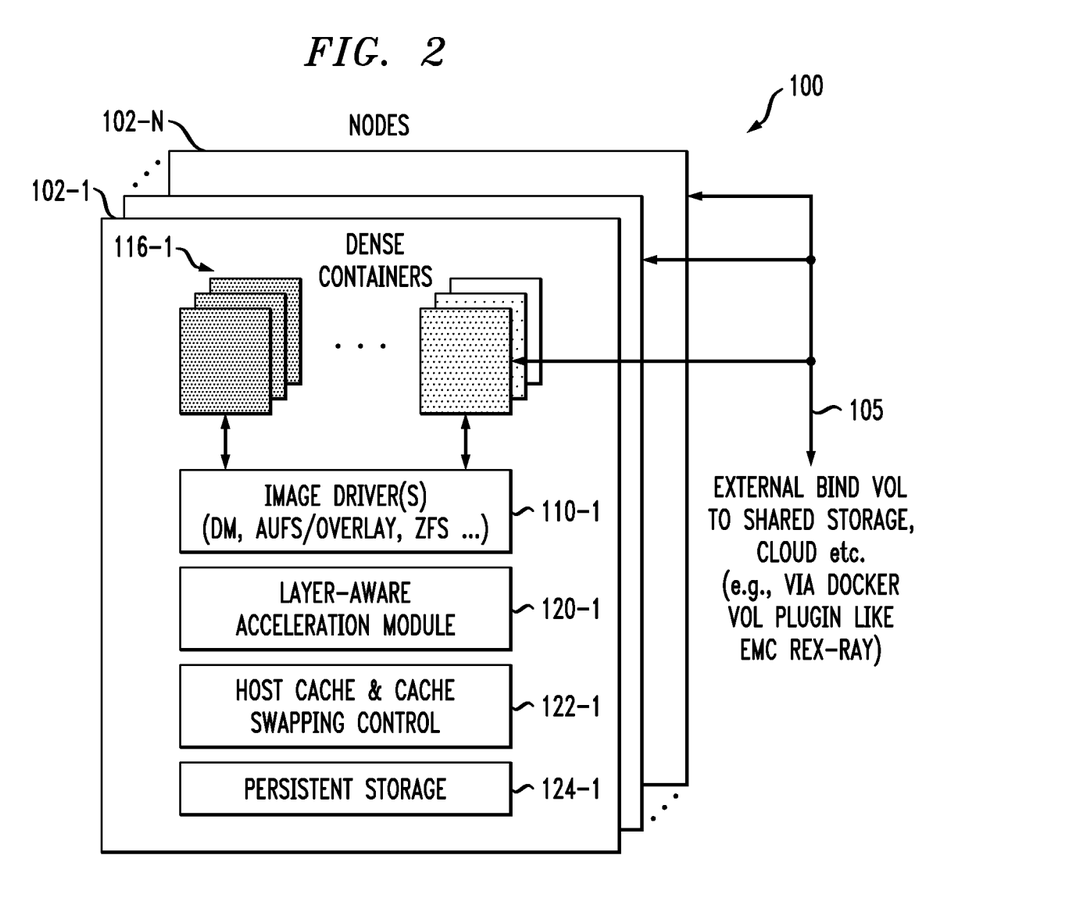
FIG. 2 shows a more detailed view of a particular node of the FIG. 1 system.

A more detailed view of a particular node 102-1 is shown in FIG. 2. It is assumed that each of the other nodes 102 is configured in a similar manner. The node 102-1 in this embodiment comprises one or more container image drivers 110-1 and the set of containers 116-1.

The one or more container image drivers 110-1 illustratively comprise block-based storage drivers such as Device-Mapper ("DM") or file-based storage drivers such as Advanced multi-layered Unification File System (AUFS) and/or overlay. Other alternative image drivers include ZFS storage drivers, and many others. Combinations of multiple such distinct image drivers can also be used.

The set of containers 116-1 is assumed to comprise a very large number of containers of a dense container deployment. Also included in the node 102-1 is a layer-aware acceleration module 120-1, a combined host cache and cache swapping control module 122-1, and persistent storage 124-1. The node 102-1 and the other similarly-configured nodes 102 are coupled via 10 data path 105 to external bind volumes in the shared storage of storage system 104. Such shared storage arrangements between the containers of the nodes 102 are illustratively implemented via corresponding Docker volume plugin modules such as REX-Ray from Dell EMC.

The layer-aware data movement control functionality in this embodiment is implemented primarily in the layer-aware acceleration modules of the respective nodes 102. A given such module 120-1 within a given one of the nodes 102-1 is arranged between the one or more container image drivers 110-1 and a corresponding host device cache subsystem illustratively comprising host cache and cache swapping control module 122-1. Other arrangements of modules are possible in other embodiments.

The layer-aware data movement control in the system 100 in some embodiments involves establishing a prefetching priority in which the container host device prefetches container data from storage system 104 into persistent storage 124-1 of the container host device starting from a read-write layer at a highest priority for prefetching from the storage system 104 and moving upward through the given layer structure with decreasing priority for successive ones of a plurality of read-only layers.

Such an arrangement can be illustratively implemented using the layer-aware acceleration module 120-1 of node 102-1, and similar acceleration modules implemented in respective other ones of the nodes 102. For example, the layer-aware acceleration module 120-1 can be configured to generate a plurality of prefetch worker threads for prefetching respective portions of the container data in accordance with the established prefetch priority.

Additionally or alternatively, the layer-aware data movement control in the system 100 in some embodiments involves establishing a cache-swapping priority in which the container host device controls movement of container data between the host cache of module 122-1 of the container host device and another storage device, such as persistent storage 124-1 or a storage device of storage system 104, starting from a read-write layer at a highest priority for remaining in the host cache and moving upward through the given layer structure with decreasing priority for successive ones of a plurality of read-only layers.

Again, such an arrangement can be illustratively implemented using the layer-aware acceleration module 120-1 of node 102-1, and similar acceleration modules implemented in respective other ones of the nodes 102. For example, the layer-aware acceleration module 120-1 can be configured to generate a plurality of cache paging threads for cache-swapping respective portions of the container data in accordance with the established cache-swapping priority.

Accordingly, the layer-aware data movement control functionality of system 100 illustratively involves controlling movement of container data between different storage devices by at least one of assigning different prefetching priority weights to different layers of the given layer structure, and assigning different cache-swapping priority weights to different layers of the given layer structure.

Within a particular one of the read-only and read-write layers of the given layer structure, the container host device illustratively utilizes one of a least recently used (LRU) policy and a least frequently used (LFU) policy applied solely within that particular layer to control movement of container data between the host cache of module 122-1 of the container host device and the other storage device such as persistent storage 124-1 or a storage device of storage system 104.

The layer-aware data movement control functionality of system 100 therefore further involves maintaining separate LRU or LFU lists for each of two or more distinct layers of the given layer structure.

The layer-aware data movement control functionality can additionally include tracking changes in layer structure over time and adjusting one or more of the prefetching priority weights and the cache-swapping priority weights in order to maintain efficient operation of the dense container deployment. As a result, the priority weights can vary dynamically over time based on changes in the layer structures as well as other characteristics associated with the corresponding containers.

As indicated previously, at least portions of the information processing system 100 are implemented in cloud infrastructure. The cloud infrastructure of the system 100 can comprise a public cloud, a private cloud or a hybrid cloud or an associated data center or other type of system implemented on one or more processing platforms. The term "cloud" as used herein is intended to be broadly construed so as to encompass, for example, combinations of multiple clouds of different types.

The nodes 102 are coupled to the storage system 104 over at least one communication network which is not explicitly shown in the figure. Such a network or networks support the IO data path 105 and management paths 106-1 through 106-N.

In some embodiments, the storage system 104 is implemented as part of the cloud infrastructure of the system 100. Alternatively, the storage system 104 can be implemented at least in part externally to that cloud infrastructure.

As noted above, the containers 116 of the nodes 102 are implemented utilizing a plurality of container host devices. The containers support execution of applications on behalf of one or more tenants of the cloud infrastructure.

For example, cloud native applications can execute in respective application containers implemented utilizing the container host devices. The container host devices may comprise Docker containers, LXD containers, Cloud Foundry Diego-based containers or other types of containers. The data required for execution of the cloud native applications is obtained from the storage system 104.

The storage system 104 can comprise any of a variety of different types of storage including network-attached storage (NAS), storage area networks (SANs), direct-attached storage (DAS), distributed DAS and software-defined storage (SDS), as well as combinations of these and other storage types. The storage platforms can be configured to provide storage for data of multiple distinct types, including blocks, objects and files.

By way of example, as illustrated in the FIG. 1 embodiment, storage system 104 of system 100 is assumed to comprise at least one of network file system (NFS) SAN-based storage and cloud-based storage.

Cloud-based storage of storage system 104 may comprise at least one object store implemented using cloud storage such as Elastic Cloud Storage (ECS) from Dell EMC. Other examples of object stores that can be utilized to provide at least a portion of storage system 104 in some embodiments include Amazon Simple Storage Service (S3), GCP Cloud Storage, and Microsoft Azure Blob Storage.

In some embodiments, the storage system 104 is implemented as a multi-tier storage system comprising at least a fast tier and a capacity tier. The fast tier illustratively comprises non-volatile electronic memory and the capacity tier comprises at least one object store. Tiering hints from applications running in the containers are used to control movement of data between the fast and capacity tiers.

The example storage system configurations described above may be part of the same processing platform or platforms that also implement cloud infrastructure used to provide at least a subset of the nodes 102.

The containers of the nodes 102 are assumed to utilize copy-on-write (COW) techniques to provide point-in-time logical views of the data from storage system 104 that is processed by those containers.

For example, COW allows multiple containers to share access to data stored in the storage system 104. If an application process in a given one of the containers needs to modify a file, block, object or other item of shared data, a separate local copy of that data item is generated on which the given container can make its modifications, while the original shared data item visible to other ones of the containers remains unchanged. These and other COW techniques typically store the resulting multiple copies in the form of layers in which each layer stores only the modifications relative to one or more other layers.

A given running container on one of the nodes 102 of the system 100 is launched utilizing one or more container images. The container images are illustratively part of a layer structure 300 of the type shown in FIG. 3.

Figure 3:
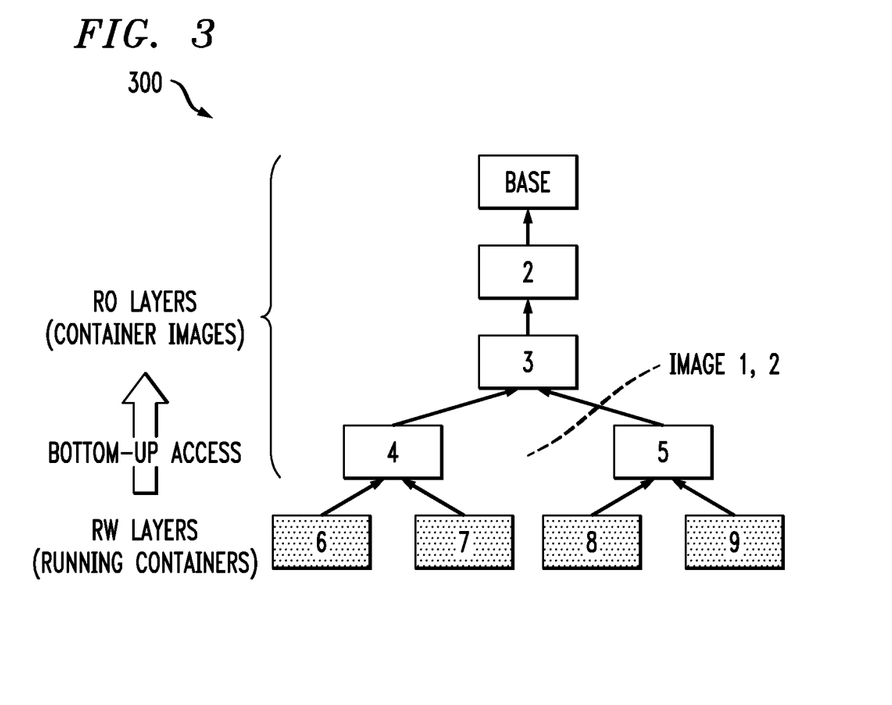
FIG. 3 shows an example of a container image layer structure associated with a plurality of containers in an illustrative embodiment.

In the example layer structure 300 of FIG. 3, there are multiple RO layers associated with respective container images and multiple RW layers associated with multiple running containers that utilize those container images. The RO layers comprise static container images and the RW layers comprise running container instances based on container images that are loaded into memory. The layer structure 300 is in the form of a tree-like hierarchy, with parent-child relationships between the container images of the various layers. Other types of layer structures can be used in other embodiments.

For purposes of illustration, illustrative embodiments will be described herein in the context of the well-known Docker application container framework, although it is to be understood that embodiments can be implemented with other types of container-based application frameworks or snapshot-based applications.

The container images of the respective RO layers in the Docker context include respective differential or "delta" layers each created in conjunction with a corresponding COW operation. A given running container is part of an RW layer and is created utilizing a container image of an immediately overlying RO layer which is itself related back through the layer structure to a base RO layer via one or more intermediate RO layers. Multiple related RO layers of the layer structure therefore collectively provide the single container image that is utilized to generate the given running container.

Container image layer structures of the type described above can grow increasingly complex, particularly in dense container deployments. Accordingly, illustrative embodiments can incorporate efficient container image layer structure access and processing techniques as disclosed in U.S. patent application Ser. No. 15/189,447, filed Jun. 22, 2016 and entitled "Accelerated Data Access Operations," and U.S. patent application Ser. No. 15/195,451, filed Jun. 28, 2016 and entitled "Container Image Layer Compaction," both of which are incorporated by reference herein in their entirety. Such techniques provide significant improvements in the processing of large numbers of potentially complex container image layer structures with a given dense container deployment.

In the FIG. 3 example, the RO layers of the layer structure include a base RO layer comprising a base container image and intermediate RO layers comprising additional container images denoted 2, 3, 4 and 5. The RW layers of the layer structure include container images denoted 6, 7, 8 and 9 of respective multiple running containers. Such running containers are also referred to as active containers. It can be seen from the figure that active containers corresponding to container images 6 and 7 share container image 4 of the immediately overlying RO layer. Similarly, active containers corresponding to container images 8 and 9 share container image 5 of the immediately overlying RO layer. Container images 4 and 5 of this immediately overlying RO layer in turn relate back to the base RO layer via container images 3 and 2 of respective intermediate RO layers.

As indicated above, the layer structure 300 illustratively supports multiple container images, including by way of example container images denoted as Image1 and Image2, collectively referred to as "Image1, 2" in the figure. These two example container images share some common portions of the RO layers and also include respective unique portions of the RO and RW layers. More particularly, Image1 illustratively comprises the base RO layer and RO layer portions 2, 3 and 4, and has two running container instances 6 and 7 corresponding to respective ones of the RW layers. If those two container instances are deleted, the corresponding portions of the RW layers will be removed. Similarly, Image2 illustratively comprises the base RO layer and RO layer portions 2, 3 and 5, and has two running container instances 8 and 9. Again, if those two container instances are deleted, the corresponding portions of the RW layers will be removed.

In this example, the base RO layer and RO layer portions 2 and 3 are common for Image1, 2 and the other RO and RW layer portions are unique for each of Image1, 2. This separation between the common and unique portions of the RO and RW layers for Image1, 2 is illustrated by the dashed line in the figure.

The active containers can read data items referenced by the container images of the RO layers. If a given one of the active containers wants to modify one or more of those data items, a COW operation is performed and the given active container can then perform write operations on its local copy. Such modifications lead to one or more additional differential container images of one or more RO layers. For example, a temporary RW layer may be created via COW for a given active container, and later removed after run or commit in conjunction with generation of a new durable RO layer. Accordingly, the layer structures of the system 100 vary over time as the containers access and modify data items associated with the various container images of those layer structures.

An initial access to particular data by an application running in a container triggers a traversal of the RO layers of the layer structure in order to locate the data and copy it via COW into the temporary RW layer. This COW process illustratively follows a "bottom-up access" pattern from the RW layers through the intermediate RO layers to the base RO layers, as illustrated in the figure. Illustrative embodiments disclosed herein advantageously utilize awareness of the container image layer structure to leverage this bottom-up access pattern to improve container data access performance.

Illustrative embodiments advantageously overcome problems of conventional arrangements, such as a lack of awareness of container image layer structures in prefetch and cache-swapping techniques, which can otherwise lead to sub-optimal performance. For example, conventional cache-swapping based on LRU or LFU policies that treat pages from different layers equally will likely result in non-optimal cache swapping and thus slower container IO performance. More particularly, in the context of the FIG. 3 layer structure, due to the bottom-up access pattern, loading of container data into host device memory for the RW layer corresponding to the running container instance 6 will involve traversal of its parent RO layers 4, 3 and 2 and then the base RO layer. Accordingly, the bottom-up access pattern indicates that layer 6 is preferable to layer 4, layer 4 is preferable to layer 3, layer 3 is preferable to layer 2, and so on, in terms of maintaining of the layers in memory. Existing LRU or LFU approaches that treat all layers equally would tend to work in the opposite manner. For example, the base RO layer data would be the most recently used and therefore the most likely to be maintained in memory, while the lower RO and RW layers would tend to be swapped out more frequently, leading to significant inefficiencies.

Figure 4:
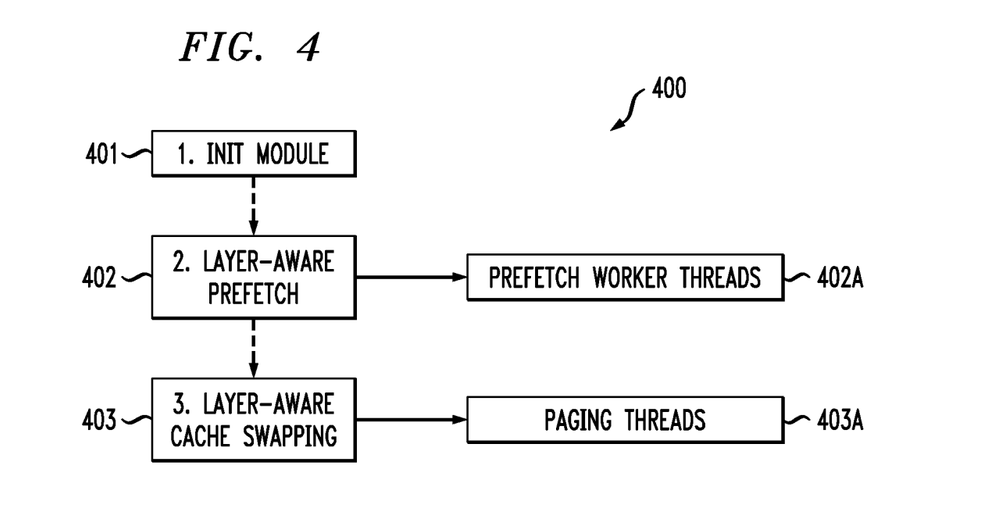
FIG. 4 is a flow diagram of a process for layer-aware data movement control for containers in an illustrative embodiment.

Referring now to FIG. 4, a process 400 is shown for layer-aware data movement control for containers in an illustrative embodiment. The layer-aware data movement control process 400 in this embodiment includes steps 401, 402 and 403, also denoted as steps 1, 2 and 3, respectively. Steps 402 and 403 include respective sub-steps denoted 402A and 403A.

It is assumed in this embodiment that the process 400 runs within a given one of the nodes 102 of the system 100 of FIG. 1, namely node 102-1. Other instances of the process 400 are assumed to be implemented in other ones of the nodes 102. In other embodiments, a multi-node layer-aware data movement control process can be implemented for coordinated movement of container data for containers across multiple nodes.

In step 401, the layer-aware acceleration module 120-1 of node 102-1 is initialized. For example, the module may be initialized in conjunction with an initialization of a corresponding container host device.

In step 402, layer-aware prefetching functionality is implemented. This illustratively involves establishing a prefetching priority in which the container host device prefetches container data from storage system 104 into persistent storage 124-1 of the container host device starting from a read-write layer at a highest priority for prefetching from the storage system 104 and moving upward through the given layer structure with decreasing priority for successive ones of a plurality of read-only layers.

In conjunction with the implementation of the layer-aware prefetching functionality, the layer-aware acceleration module 120-1 generates a plurality of prefetch worker threads for prefetching respective portions of the container data in accordance with the established prefetch priority, as illustrated in sub-step 402A.

For example, parent RO layers of a given running container instance can be prefetched, such as RO layers 4, 3 and 2 and the base RO layer for running container instance 6 of the RW layer in the layer structure 300 of FIG. 3. Such prefetching for a file-based storage driver such as AUFS could involve prefetching file inode of the parent layers, while for a block-based driver such as DeviceMapper it could involve prefetching relevant block mappings. It is also possible to prefetch neighbor data within a given layer of the layer structure based on the current container access history. These and other types of prefetching tasks are illustratively implemented by prefetch worker threads. Alternative types of background threads could be used for this purpose in other embodiments.

Prefetching based on layer structure can also take advantage of additional cross-container efficiencies. For example, actual data retrieval records may be collected across layers for multiple containers starting from a first container using a particular container image. A given record of this type may include information such as {dataLogicalBlockNumber, LayerRetrieved, PhysicalBlockNumber}.

The records may be kept in memory on the container host device and optionally persisted to disk or other secondary storage of the storage system 104. As other container instances are started, the records can be traversed and the corresponding container data loaded directly without traversal of the RO layers if there is a "hit" in the records. Otherwise the RO layers can be traversed and the records updated accordingly. These records can be shared across all container instances that utilize a given container image, as long as there is no change in the layer structure such as a commit of a new layer or removal of an existing layer.

In step 403, layer-aware cache swapping functionality is implemented. This illustratively involves establishing a cache-swapping priority in which the container host device controls movement of container data between the host cache of module 122-1 of the container host device and another storage device, such as persistent storage 124-1 or a storage device of storage system 104, starting from a read-write layer at a highest priority for remaining in the host cache and moving upward through the given layer structure with decreasing priority for successive ones of a plurality of read-only layers.

In conjunction with the implementation of the layer-aware cache swapping functionality, the layer-aware acceleration module 120-1 generates a plurality of cache paging threads for cache-swapping respective portions of the container data in accordance with the established cache-swapping priority, as illustrated in sub-step 403A.

Although not illustrated in the figure, additional instances of steps 402 and 403 and their respective sub-steps 402A and 403A can be repeated iteratively.

The process 400 is assumed to run substantially continuously after module initiation in step 401 in order to be responsive to layer structure changes in one or more containers and to initiate appropriate data movement for those containers. The particular types of data movement provided for a given container or set of containers may therefore vary dynamically over time in accordance with changes in the layer structures of the containers.

In the FIG. 4 embodiment, awareness of the container image layer structures and their associated bottom-up access patterns is exploited in establishing prefetch and cache-swapping priorities. Advantageously, optimal container data access can be achieved without altering the container image layer structures and without altering the bottom-up access pattern which is important to guaranteeing data correctness.

Figure 5:
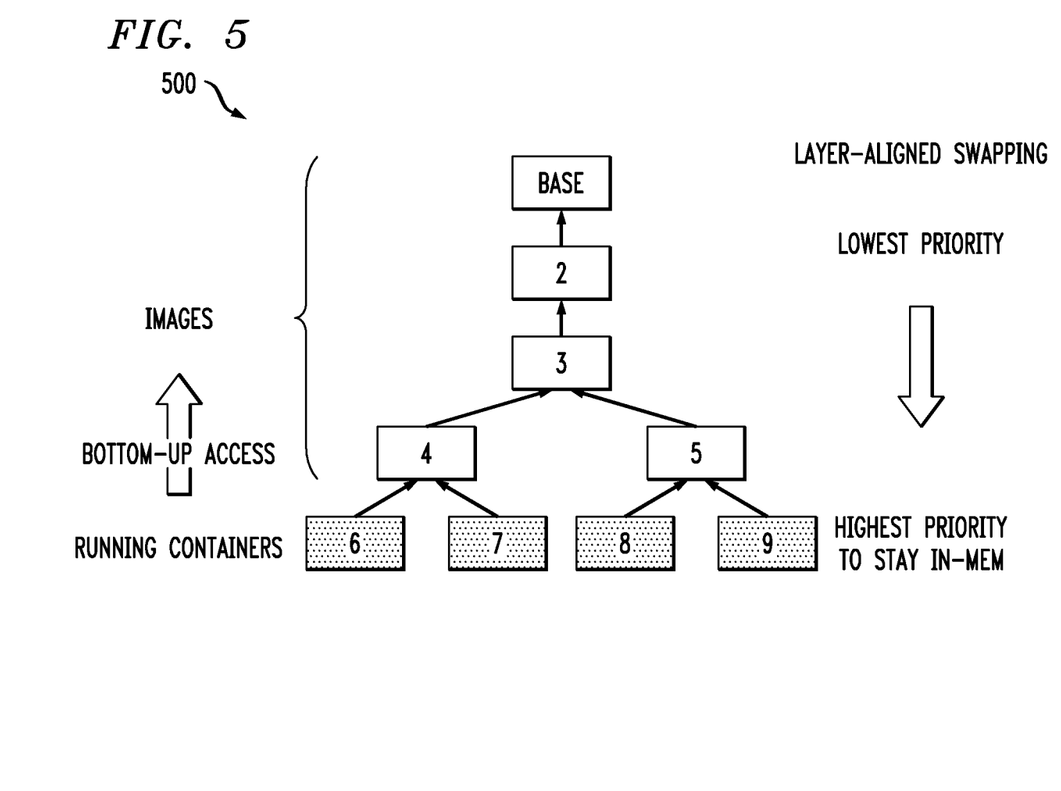
FIGS. 5 and 6 show examples of layer-aware data movement control for containers having the container image layer structure of FIG. 3.
Figure 6:
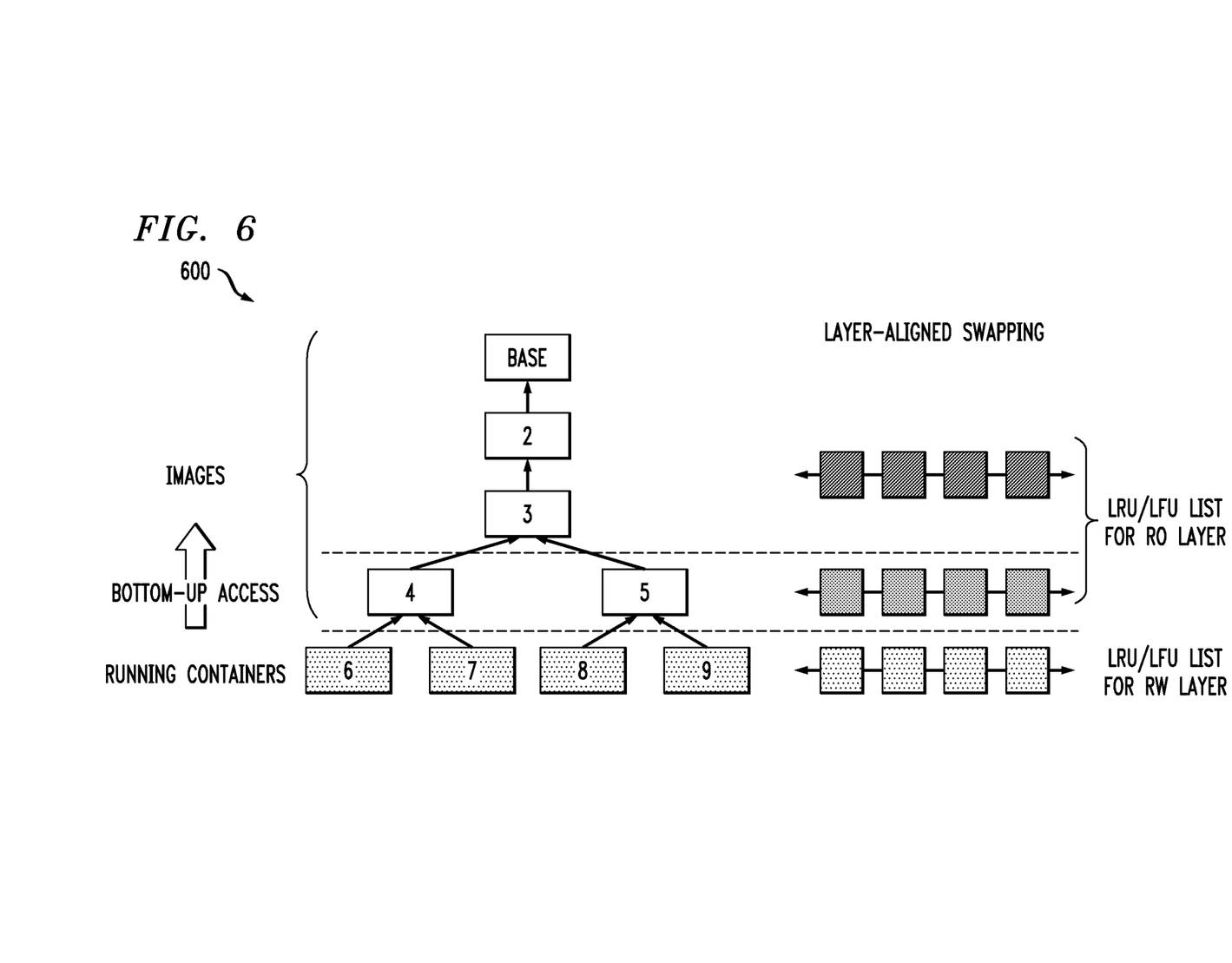

FIGS. 5 and 6 show examples of layer-aware data movement control for containers having the container image layer structure of FIG. 3.

With reference initially to FIG. 5, an embodiment 500 utilizes a type of layer-aware data movement control referred to herein as "layer-aligned swapping." In this embodiment, the base RO layer has the lowest priority for remaining in the memory of the container host device, while the running containers of the RW layer have the highest priority for remaining in the memory of the container host device. Accordingly, the lower-numbered layers are the layers that are most likely to be swapped out of the container host device memory, thereby taking advantage of the bottom-up access pattern of the layer structure. Each layer can be assigned a different priority weight. Alternatively, groups of two or more layers, such as all of the RO layers, can be considered as having the same priority and therefore assigned the same priority weight. Such an arrangement separates the layers of the layer structure into two classes, namely, a first class comprising all of the RO layers ("non-leaf layers") and a second class comprising all of the RW layers ("leaf layers").

In the FIG. 5 example, the base RO layer will have the lowest priority for remaining in memory, and therefore the highest priority for being swapped out of memory and replaced with other container data. The running container RW layer has the highest priority for remaining in memory, and therefore the lowest priority for being swapped out of memory and replaced with other container data.

FIG. 6 illustrates a similar layer-aware data movement arrangement 600 of layer-aligned swapping, but further illustrates that within a given RO layer or set of RO layers, a separate LRU or LFU list is maintained for purposes of cache-swapping priority. Also, within the RW layer, a separate LRU or LFU list is maintained for purposes of cache-swapping priority. Caching statistics can therefore be maintained on a per-layer basis and used to control the cache-swapping in accordance with the LRU or LFU policy. The caching statistics could be of the form {AccessReq #, AccessHit #}, and then based on the LRU or LFU policy, container data with a higher hit ratio or a higher hit count within a given layer could be kept in memory longer than other container data within that layer.

In the above examples of FIGS. 5 and 6, non-leaf container data is swapped out before leaf container data. This can be considered a default approach. Alternatively, multiple LRU or LFU lists can be swapped out in parallel, but using different quotas to ensure that non-leaf layers contribute more data to the swap-out than the leaf layers. Hybrid combinations of these two approaches can also be used. For example, the default approach in which only non-leaf container data is swapped out can be used responsive to an early warning from the memory (e.g., usage at 60%), but if further memory pressure reaches high water mark (e.g., usage at 75%), both leaf and non-leaf layers can be required to contribute to the swap-out.

In embodiments which utilize a single-list LRU or LFU policy, paging threads can traverse the list so as to select non-leaf data for swap-out before leaf data. A suitable contention prevention arrangement could also be implemented for the single list.

The layer-aware data movement control techniques disclosed herein can be applied to both data and metadata. Accordingly, the term "container data" as used herein should be understood to encompass associated metadata.

It should be noted that existing container memory quotas or limits apply to user space applications running in a container, but not to container host device kernel space data and metadata such as container images.

The techniques disclosed herein are transparent to the application running in the container, and do not impact application functions in any way.

Illustrative embodiments can be integrated with policy control functionality within the system.

For example, configurable parameters could be provided to turn on or turn off the layer-aware data movement control functionality globally within a given container host device or for particular container images or associated layer structures.

Prefetching policy control could include configurable parameters for the number of next layers to be prefetched or the number of neighbor blocks or files to be prefetched.

Swapping policy control could include configurable parameters for priority weights between layers or groups of layers, as well as LRU or LFU policies for cache-swapping within a given layer based on hit ratios or hit counts. Other examples include swapping thread number and concurrent swapping data number.

In some embodiments, layer-aware data movement control functionality is integrated with other types of existing system functionality.

For example, the layer-aware acceleration modules can be integrated into existing storage drivers for containers. This could include implementing the acceleration modules as respective add-on modules to generic drivers. The presence of such add-on modules could be made apparent via an extended flag that is asserted during file system mount or block device creation processes. Additionally or alternatively, newly-designed container storage drivers could be configured to include such modules.

As another example, existing container monitoring and metadata configurations can be extended in a straightforward manner to support layer-aware data movement control as disclosed herein. Layer-aware acceleration modules such as acceleration module 120-1 of FIG. 2 can be provided as part of an extended engine plugin of a Docker engine or other type of container control engine. Existing APIs can be extended or new APIs added to support access to container image layer structures.

The disclosed layer-aware data movement control functionality can be readily integrated with existing container management technologies such as SWARM and Kubernetes.

In addition, the disclosed layer-aware data movement control functionality can be utilized with a wide variety of different types of storage systems, including storage systems comprising ScaleIO™ software-defined storage and/or Isilon® platform nodes, both from Dell EMC. For example, a given multi-tier storage system referred to herein can include a fast tier implemented at least in part using ScaleIO™ software-defined storage and a capacity tier implemented at least in part utilizing a scale-out NAS cluster comprising Isilon® platform nodes. Both ScaleIO™ and Isilon® support Docker volume plug-ins using REX-Ray. Numerous other storage systems can be used in other embodiments.

Accordingly, illustrative embodiments can be implemented at least in part utilizing an extended engine plugin configured to support layer-aware data movement control functionality as disclosed herein. Such an extended engine plugin can be configured to operate in conjunction with existing COW infrastructure such as one or more Docker container engines backed by COW DeviceMapper and AUFS storage drivers. Other snapshot frameworks can be used in other embodiments.

Layer-aware data movement control functionality such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 6 are presented by way of illustrative example only, and should not be construed as limiting in any way. As noted above, the described layer-aware data movement control functionality can be implemented using additional or alternative components. Accordingly, a wide variety of different layer-aware data movement control arrangements for container deployments can be used in other embodiments.

The illustrative embodiments described above provide significant advantages over conventional arrangements.

For example, some embodiments provide an awareness of container layer structure in implementing prefetching, cache swapping and other types of container data movement that otherwise would not take such layer structure into account in the data movement control process. These embodiments leverage the container layer structure and associated access patterns to optimize container data access in a shared storage environment.

Illustrative embodiments achieve substantially improved performance and storage efficiency relative to conventional arrangements, particularly for prefetching and cache swapping of container data.

Utilization of layer-aware data movement control of the type described in conjunction with illustrative embodiments herein provides scalable and highly efficient data movement and associated data services optimization. As a result, containers can be more efficiently managed and system performance is improved in terms of data services relating to storage, networking, security and other features.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as nodes 102, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
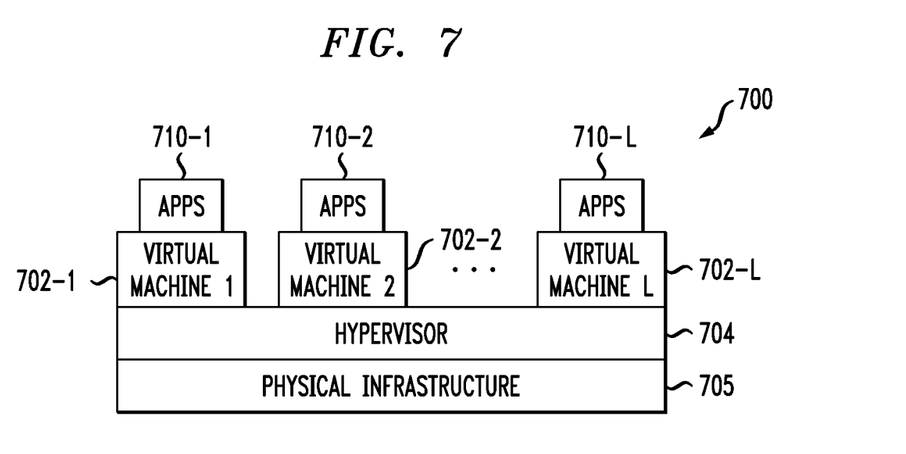
FIGS. 7 and 8 show examples of processing platforms that may be utilized to implement at least a portion of an information processing system in illustrative embodiments.
Figure 8:
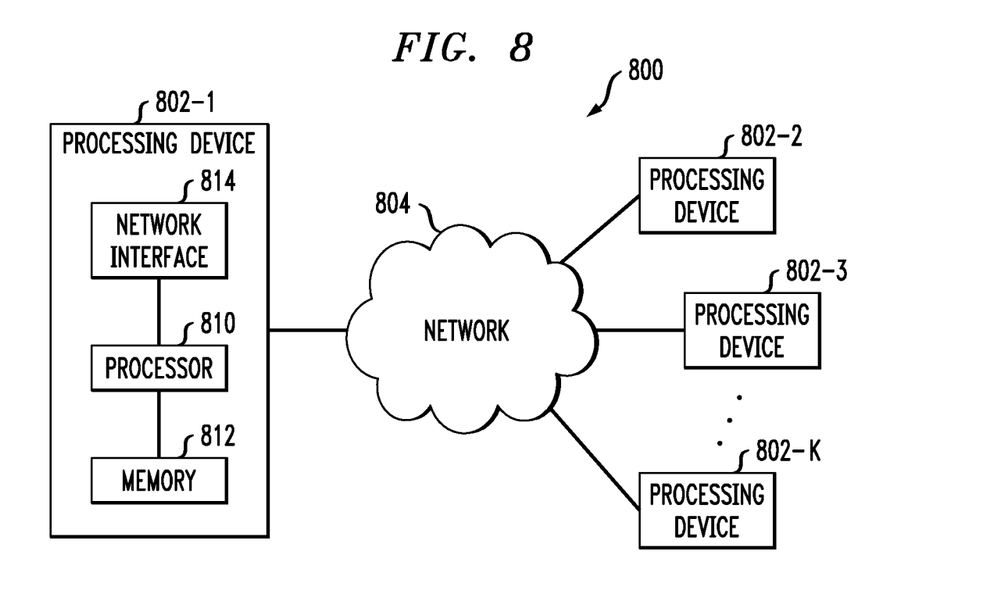

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

These and numerous other alternative cloud computing environments can be configured to implement layer-aware data movement control as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of container groups and associated data services are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, cloud infrastructure, processing platforms, nodes, containers, container host devices, container image layer structures, data movement control techniques, drivers, data services and storage systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a plurality of container host devices;
the container host devices implementing a plurality of containers for executing applications on behalf of one or more tenants of cloud infrastructure;
the containers having associated layer structures each characterizing container images of respective different ones of the containers;
wherein movement of container data between different storage devices by at least one of the container host devices for at least one of the containers is controlled based at least in part on one or more characteristics of a corresponding one of the layer structures; and
wherein controlling movement of container data between different storage devices by at least one of the container host devices for at least one of the containers based at least in part on one or more characteristics of the given layer structure comprises establishing a prefetching priority in which the container host device prefetches container data from an external storage system into persistent storage of the container host device starting from a read-write layer at a highest priority for prefetching from the external storage system and moving upward through the given layer structure with decreasing priority for successive ones of a plurality of read-only layers;
the container host devices being implemented on at least one processing platform comprising a processor coupled to a memory.

2. The apparatus of claim 1 wherein at least a subset of the container host devices comprise respective virtual machines controlled by a hypervisor of the processing platform.

3. The apparatus of claim 1 wherein the container host devices are configured as a plurality of nodes each sharing a common storage system external to the container host devices.

4. The apparatus of claim 1 wherein the different storage devices comprise at least portions of respective persistent storage of a given one of the container host devices and an external storage system shared by the container host devices.

5. The apparatus of claim 1 wherein at least one of the container host devices is configured to control movement of container data between different storage devices by swapping at least a portion of the container data stored in a cache of the container host device with one or more other portions of container data stored in another storage device based at least in part on one or more characteristics of a corresponding one of the layer structures.

6. The apparatus of claim 1 wherein a given one of the layer structures comprises:
one or more read-only layers each associated with one or more of the container images; and
one or more read-write layers each associated with at least one running instance of at least one of the containers.

7. The apparatus of claim 1 further comprising an acceleration module implemented in the container host device and configured to generate a plurality of prefetch worker threads for prefetching respective portions of the container data in accordance with the established prefetch priority.

8. The apparatus of claim 1 wherein controlling movement of container data between different storage devices by at least one of the container host devices for at least one of the containers based at least in part on one or more characteristics of the given layer structure comprises establishing a cache-swapping priority in which the container host device controls movement of container data between a cache of the container host device and another storage device starting from a read-write layer at a highest priority for remaining in the cache and moving upward through the given layer structure with decreasing priority for successive ones of a plurality of read-only layers.

9. The apparatus of claim 8 further comprising an acceleration module implemented in the container host device and configured to generate a plurality of cache paging threads for cache-swapping respective portions of the container data in accordance with the established cache-swapping priority.

10. The apparatus of claim 8 wherein within a particular one of the read-only and read-write layers of the given layer structure, the container host device utilizes one of a least recently used policy and a least frequently used policy applied solely within that particular layer to control movement of container data between the cache of the container host device and the other storage device.

11. The apparatus of claim 1 wherein controlling movement of container data between different storage devices by at least one of the container host devices for at least one of the containers based at least in part on one or more characteristics of the given layer structure comprises at least one of:
assigning different prefetching priority weights to different layers of the given layer structure; and
assigning different cache-swapping priority weights to different layers of the given layer structure.

12. The apparatus of claim 1 wherein controlling movement of container data between different storage devices by at least one of the container host devices for at least one of the containers based at least in part on one or more characteristics of the given layer structure comprises maintaining separate least recently used or least frequency used lists for each of two or more distinct layers of the given layer structure.

13. A method comprising:
configuring a plurality of container host devices in cloud infrastructure;
utilizing the container host devices to implement a plurality of containers for executing applications on behalf of one or more tenants of the cloud infrastructure;
obtaining layer structures each characterizing container images of respective different ones of the containers; and
controlling movement of container data between different storage devices by at least one of the container host devices for at least one of the containers based at least in part on one or more characteristics of a corresponding one of the layer structures;

wherein controlling movement of container data between different storage devices by at least one of the container host devices for at least one of the containers based at least in part on one or more characteristics of the given layer structure comprises establishing a prefetching priority in which the container host device prefetches container data from an external storage system into persistent storage of the container host device starting from a read-write layer at a highest priority for prefetching from the external storage system and moving upward through the given layer structure with decreasing priority for successive ones of a plurality of read-only layers;

the method being performed by at least one processing platform comprising a processor coupled to a memory.

14. The method of claim 13 wherein controlling movement of container data between different storage devices by at least one of the container host devices for at least one of the containers based at least in part on one or more characteristics of the given layer structure comprises establishing a cache-swapping priority in which the container host device controls movement of container data between a cache of the container host device and another storage device starting from a read-write layer at a highest priority for remaining in the cache and moving upward through the given layer structure with decreasing priority for successive ones of a plurality of read-only layers.

15. A computer program product comprising a non-transitory processor-readable storage medium having stored therein program code of one or more software programs, wherein the program code when executed by at least one processing platform comprising a processor coupled to a memory causes the processing platform:

to configure a plurality of container host devices in cloud infrastructure;

to utilize the container host devices to implement a plurality of containers for executing applications on behalf of one or more tenants of the cloud infrastructure;

to obtain layer structures each characterizing container images of respective different ones of the containers; and to control movement of container data between different storage devices by at least one of the container host devices for at least one of the containers based at least in part on one or more characteristics of a corresponding one of the layer structures;

wherein controlling movement of container data between different storage devices by at least one of the container host devices for at least one of the containers based at least in part on one or more characteristics of the given layer structure comprises establishing a prefetching priority in which the container host device prefetches container data from an external storage system into persistent storage of the container host device starting from a read-write layer at a highest priority for prefetching from the external storage system and moving upward through the given layer structure with decreasing priority for successive ones of a plurality of read-only layers.

16. The computer program product of claim 15 wherein controlling movement of container data between different storage devices by at least one of the container host devices for at least one of the containers based at least in part on one or more characteristics of the given layer structure comprises establishing a cache-swapping priority in which the container host device controls movement of container data between a cache of the container host device and another storage device starting from a read-write layer at a highest priority for remaining in the cache and moving upward through the given layer structure with decreasing priority for successive ones of a plurality of read-only layers.

17. The computer program product of claim 15 wherein at least one of the container host devices is configured to control movement of container data between different storage devices by swapping at least a portion of the container data stored in a cache of the container host device with one or more other portions of container data stored in another storage device based at least in part on one or more characteristics of a corresponding one of the layer structures.

18. The computer program product of claim 15 wherein at least a subset of the container host devices comprise respective virtual machines controlled by a hypervisor of the processing platform.

19. The computer program product of claim 15 wherein the container host devices are configured as a plurality of nodes each sharing a common storage system external to the container host devices.

20. The computer program product of claim 15 wherein the different storage devices comprise at least portions of respective persistent storage of a given one of the container host devices and an external storage system shared by the container host devices.

* * * * *